Patented Dec. 15, 1936

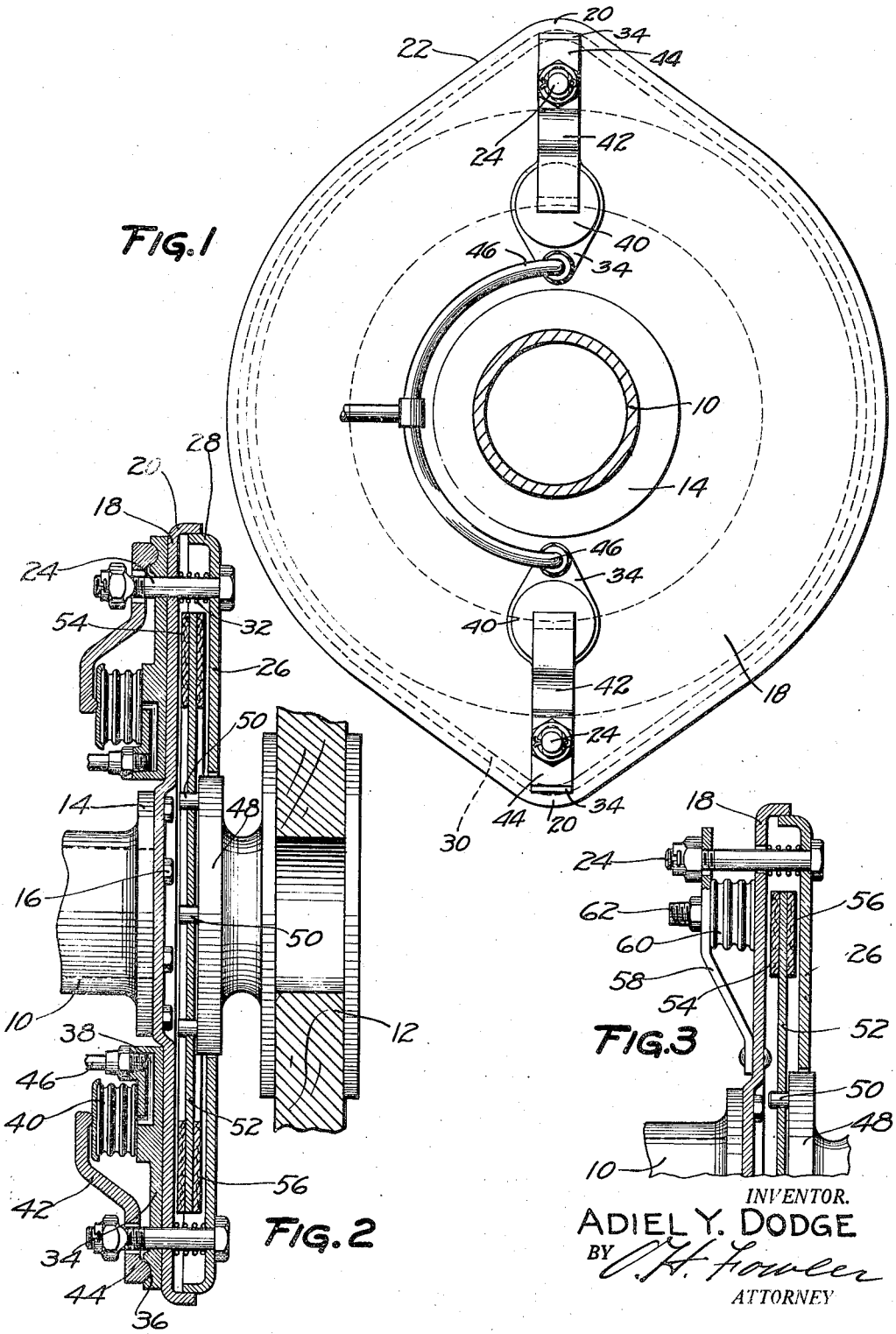

2,064,595

UNITED STATES PATENT OFFICE 2,064,595

BRAKE

Adiel Y. Dodge, South Bend, Ind., assignor to Bendix Aviation Corporation, South Bend, Ind., a corporation of Delaware Application March 21, 1932, Serial No. 600,333

10 Claims. (Cl. 188—72)

This invention relates to brakes and more particularly to disc brakes.

Broadly the invention comprehends a fixed member, an axially movable member, a rotatable and axially movable member, and means for frictionally engaging the members for effectively retarding rotation of the rotatable member.

In the illustrative embodiment of the invention there are two stamped discs, one secured in a fixed position and another axially movable with respect thereto. The fixed disc and the axially movable disc are arranged to house a rotatable and axially movable disc carrying friction linings for engagement with the fixed and axially movable discs. The fixed disc supports a plurality of expansible members connected through levers for effectively engaging the disc to retard rotation of the rotatable disc.

An object of the invention is to provide a disc brake of the character described with an operating means including levers actuated through an expansible member such as a bellows suitably connected to a fluid pressure means.

Another object of the invention is to provide a brake having relatively few parts including a fixed member, an axially movable member, a rotatable and axially movable member, and means for engaging these members including levers and fluid pressure means for actuating the levers for effectively retarding rotation of the rotatable member.

A feature of the invention is a brake structure including an expansible member and a lever operated thereby.

Another feature of the invention is a brake structure including a fixed disc, an axially movable disc, and means connecting the discs including a lever and a bellows on the fixed disc suitably connected to fluid pressure means.

Other objects and features of the invention will appear from the following description taken in connection with the drawing, which form a part of this specification, and in which:

Figure 1 is a side elevation of a brake mechanism illustrating the operating means;

Figure 2 is a vertical sectional view; and

Figure 3 is a vertical sectional view illustrating a modification.

Referring to the drawing for more specific details of the invention, 10 represents an axle housing in which is positioned an axle, not shown. The axle has positioned thereon for rotation a wheel 12. The axle housing is provided with a flange 14 to which is secured as by bolts 16 a stamped disc 18 having a peripheral flange 20, the object of which will hereinafter appear.

As shown, the disc 18 is provided with diametrically disposed extended portions 22 apertured to receive bolts 24. These bolts support for axial movement a disc 26 having a peripheral flange 28 corresponding to the flange 20 on the disc 18. This disc is also provided with projections 30 corresponding to the projections 22 on the disc 18, and the projections are apertured to receive the bolts 24. The bolts 24 have positioned thereon between the disc 18 and the disc 26 coil springs 32 tending to force the discs 18 and 26 apart. The flange on the disc 18 telescopes the flange on disc 26 to provide a suitable housing for the friction elements of the brakes.

Plates 34 arranged in oppositely disposed relation on the disc 18 are provided with sockets 36. These plates also have passages 38 communicating with bellows 40 supported on the plates. Levers 42 are loosely sleeved on the bolt 24. The fulcrums 44 of these levers are seated in the socket 36 and the force applying end of the levers engage the bellows. The passages 38 communicating with the bellows are connected as by tubes 46 to a suitable fluid pressure means.

The hub of the wheel 12 has a flange 48 provided with a plurality of pins 50, and a disc 52 is positioned for axial movement on the pins. This disc has friction linings 54 and 56 adaptable for engagement with the discs 18 and 26.

A modification of the invention is illustrated in Figure 3. In this modification, the fixed disc 18 has suitably secured thereto straps 58. As shown, one end of each strap is secured to the disc as by rivets and the other ends of the straps are slotted to receive the bolts 24. Each of the straps support a bellows 60 interposed between the straps and the disc 18. The bellows are connected as at 62 to fluid pressure means.

In the preferred form, fluid is admitted to the bellows under pressure to expand the bellows and thereby actuate the levers 42, whereupon the disc 26 is moved toward disc 18 to effectively engage the disc 52 to retard rotation of the wheel. In the modification, fluid is admitted to the bellows 60 under pressure to expand the bellows and to move the straps outwardly, whereupon the disc 26 is moved toward the disc 18 to effectively engage the disc 52 to retard rotation thereof.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a fixed member, an axially movable member, and means for moving the axially movable member including a lever fulcrumed at one end on said fixed member, and a bellows for actuating the lever.

2. A brake comprising a fixed member, an axially movable member, a member connecting the fixed and the axially movable members, a lever fulcrumed at one end on said fixed member and attached on the connecting member, and a bellows for actuating the lever.

3. A brake comprising a fixed friction member, an axially movable friction member on one side of said fixed member, a rotatable and axially movable member between the fixed member and the axially movable member and centrally supported, and means for moving the axially movable member including bellows secured to the other side of the fixed member.

4. A brake comprising a fixed member, an axially movable member, a rotatable axially movable member between the fixed member and the axially movable member, and means for moving the axially movable member including a bellows and a lever fulcrumed at one end on said fixed member and actuated thereby.

5. A brake comprising a fixed member having diametrically disposed extended portions, an axially movable disc having corresponding extended portions, bolts passing through openings in the extended portions, levers on the bolts fulcrumed on the fixed member, and a bellows actuated by fluid pressure for operating the lever.

6. A brake comprising a fixed member having diametrically disposed extended portions, an axially movable member having complementary portions, a rotatable member between the fixed and axially movable members, means connecting the fixed and axially movable members, levers fulcrumed at one end on said fixed member and attached to the connecting means and bellows actuated by fluid under pressure operating the levers.

7. A brake comprising a fixed member, an axially movable member, bolts secured at one end to said movable member and connecting the members, straps on the bolts, bellows positioned between each of the straps and the fixed member, and means connecting the bellows to fluid pressure means.

8. A brake comprising a pair of non-rotatable friction members, a rotatable friction member therebetween, and means for moving the non-rotatable friction means toward one another to engage said rotatable member, said means comprising a plurality of stems freely passing through one of said friction members and fixed to the other, return springs threaded on said stems and positioned between the non-rotatable members, and applying means located adjacent the outside of said one non-rotatable member for pulling said stem therethrough.

9. A brake comprising a pair of non-rotatable friction members, a rotatable friction member therebetween, and means for moving the non-rotatable friction means toward one another to engage said rotatable member, said means comprising a plurality of stems freely passing through one of said friction members and fixed to the other, return springs threaded on said stems and positioned between the non-rotatable members and hydraulic applying means located adjacent the outside of said one non-rotatable member for pulling said stem therethrough.

10. A brake comprising a pair of non-rotatable friction members, a rotatable friction member therebetween, means for moving the non-rotatable friction means toward one another to engage said rotatable member, said means comprising a plurality of stems freely passing through one of said friction members and fixed to the other, return springs threaded on said stems and positioned between the non-rotatable members, and fluid pressure applying means located adjacent the outside of said one non-rotatable member for pulling said stem therethrough, and means independent of said stems for resisting rotation of said non-rotatable members.

ADIEL Y. DODGE.